United States Patent [19]

Gras et al.

[11] Patent Number: 5,331,078
[45] Date of Patent: Jul. 19, 1994

[54] BLOCKED HIGHLY FUNCTIONAL POLYISOCYANATE ADDUCTS, A PROCESS FOR THE PREPARATION THEREOF AND THE USE THEREOF

[75] Inventors: Rainer Gras, Bochum; Elmar Wolf, Recklinghausen, both of Fed. Rep. of Germany

[73] Assignee: Huls Aktiengesellschaft, Marl, Fed. Rep. of Germany

[21] Appl. No.: 946,087

[22] Filed: Sep. 17, 1992

[30] Foreign Application Priority Data

Oct. 15, 1991 [DE] Fed. Rep. of Germany ....... 4134032

[51] Int. Cl.⁵ .............................................. C08G 18/81
[52] U.S. Cl. ...................................... 528/45; 528/44; 528/48; 528/52
[58] Field of Search .................. 528/44, 45, 48, 52

[56] References Cited

U.S. PATENT DOCUMENTS 4,354,014 10/1982 Wolf et al. ............................. 528/45
4,507,427 3/1985 Potter et al. ........................... 528/45

Primary Examiner—John Kight, III
Assistant Examiner—Duc Truong
Attorney, Agent, or Firm—Oblon, Spivak, McClelland, Maier & Neustadt

[57] ABSTRACT

A blocked highly functional polyisocyanate adduct is described with a melting point of <128° C., preferably 80°–110° C., which is characterized in that the blocked polyisocyanate adduct with a functionality >2 contains 1.1–2 mol of blocking agent per blocked NCO group.

18 Claims, No Drawings

BLOCKED HIGHLY FUNCTIONAL POLYISOCYANATE ADDUCTS, A PROCESS FOR THE PREPARATION THEREOF AND THE USE THEREOF

BACKGROUND OF THE INVENTION

1. Field of the Invention

The present invention relates to a specific diisocyanate adduct which is blocked with ε-caprolactam and is based, in particular, on isophorone diisocyanate (IPDI), to a process for the preparation thereof and to the use thereof for producing light-resistant polyurethane resin powders (hereinafter PUR powders).

2. Discussion of the Background

Thermosetting powder compositions which are obtained by reacting a resin which contains hydroxyl groups with a masked polyisocyanate form part of the state of the art and are widely used. The isocyanates preferred for thermosetting powder compositions are (cyclo)aliphatic polyisocyanates, specifically because of their excellent ageing characteristics compared with the aromatic isocyanates which have, in particular, the disadvantage of yellowing on storing and ageing.

The PUR powder hardeners which have become particularly widely used are isocyanate-polyol adducts which are blocked with ε-caprolactam and are based on isophorone diisocyanate. The reason for this is very probably the great difference in the reactivity of the two NCO groups in IPDI, which allows for specific formation of adducts of IPDI with the polyol, providing a narrow molecular weight distribution. A narrow molecular weight distribution of the hardener is the precondition for good levelling of the cured powder.

IPDI blocked with ε-caprolactam melts at 53°–55° C. As a consequence of the low melting point, caking of the PUR powders prepared from this blocked IPDI occurs on storage. To increase the melting point, IPDI is subjected, before the ε-caprolactam blocking, to an increase in molecular weight, for example by chain extension with a polyol, or by partial trimerization and/or dimerization.

Specified as chain extenders for IPDI in DE-C 2,105,777 are polyols such as trimethylolpropane, 2,2,4(2,4,4)-trimethyl-1,6-hexanediol, diethylene glycol, in DE-A 2,542,191 are mixtures of di- and trifunctional polyols, and in U.S. Pat. No. 3,931,117 are trifunctional polyols. DE-A 2,735,497 describes the use of partially trimerized IPDI blocked with ε-caprolactam as PUR powder hardener; partially dimerized aliphatic diisocyanates, specifically IPDI, whose free-NCO groups are partially or completely blocked with ε-caprolactam are likewise described as PUR powder hardeners (DE-A 2,420,475). DE-A 3,143,060 describes PUR powder hardeners which are obtained by chain extension of IPDI with an aliphatic diamine and subsequent ε-caprolactam blocking.

It is common to all these PUR powder hardeners that they are straightforward to prepare in a one-pot process. On an industrial scale, there are limits to this one-pot process when the melting ranges of the blocked polyisocyanate adducts are in the vicinity of the unblocking temperature of the reaction product, because partial unblocking of the blocked polyisocyanate adducts must be expected when the reactor is emptied. It is furthermore known that, in the case of PUR powders, the chemical resistance (in the case of a polyol) improves as the functionality of the hardener increases. This association of the effect of the functionality of the blocked polyisocyanate adduct on the properties of the PUR powder coating was shown very impressively in the Powder Coatings Symposium in London on 30.10.1987 (R. Gras; H. Schnurbusch).

The PUR powder hardener with superior properties presented there has an NCO functionality of about 3.3 and a melting range of 145°–148° C. The preparation of a hardener of this type on an industrial scale is, as already described, impossible or possible only with very great difficulty in a simple one-pot process because of the high melting point. This is very probably the reason why this hardener, which makes it possible to produce powder coatings with excellent solvent resistance, is not yet commercially available.

The object of the present invention was thus to prepare blocked highly functional polyisocyanate adducts of good chemical resistance with a melting point <120° C., preferably 80°–110° C., by a simple process which can be carried out industrially.

It has surprisingly been found that compounds of this type with low melting point and good solvent resistance are obtained when the diisocyanate adduct employed for the blocking is reacted with the blocking agent, specifically ε-caprolactam, not in the NCO: (monofunctional) blocking agent equivalent ratio of 1:1 but in the ratio of 1:1.1–2. It was not predictable and particularly surprising that the excess of blocking agent which, after all, partly remains in the surface coating after hardening has no adverse effect on the coating surface. Exactly the opposite would have been expected.

SUMMARY OF THE INVENTION

Accordingly, one object of this invention is to provide blocked, highly functional polyisocyanate adducts with a melting point <128° C., preferably <120° C., more preferably 80°–110° C., which are characterized in that the blocked polyisocyanate adduct prepared from a polyisocyanate with a functionality >2 contains 1.1–2 mol of blocking agent per blocked NCO group.

The compounds according to the invention are distinguished by containing 6–15%, preferably 9–12%, blocked NCO and containing 2–30% wt. preferably 10–22%, (free) ε-caprolactam. Besides the blocked-NCO groups, the compounds according to the invention contain isocyanurate or biuret groups or urethane groups and/or urea groups.

The present invention further relates to a process for the preparation of the compounds according to the invention, which are characterized in that the polyisocyanate adduct is reacted with the monofunctional blocking agent in the NCO: (monofunctional) blocking agent equivalent ratio of 1:1.1–2.

The reaction is carried out in such a way that the blocking agent is added in portions in the stated ratio to the diisocyanate adduct which has been melted at 130°–160° C. The viscosity of the reaction mixture increases in proportion to the extent of reaction of the diisocyanate adduct with the blocking agent and reaches the maximum when exactly 1 mol of blocking agent has reacted per NCO equivalent of the diisocyanate adduct. In some cases, the reaction mixture temperature must then be increased to about 180° C. for thorough mixing. However, this is necessary only for a short time because the melting point of the reaction mixture decreases very rapidly on further addition of the blocking agent.

DETAILED DESCRIPTION OF THE PREFERRED EMBODIMENT

The following diisocyanate adducts are suitable for the process according to the invention:

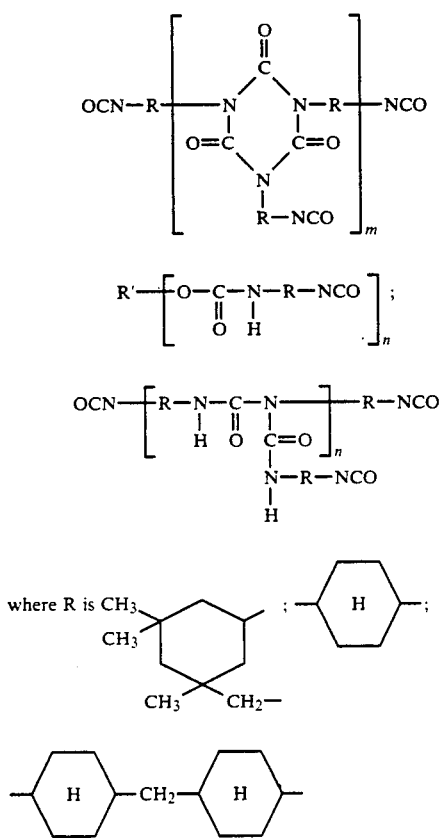

and m is 1–4; n is 3 or 4 and R' is the hydrocarbon radical of a polyol.

The isocyanate adducts A), B) and C) are prepared by known processes.

The isocyanate adducts A) containing isocyanurate groups are prepared as disclosed in DE 2,644,684 and 2,916,201. The procedure for this is such that the diisocyanate is partially reacted with a catalyst (about 40% reaction) and then the unreacted diisocyanate is removed by thin film distillation. The isocyanurates prepared in this way can also be employed as a mixture with up to about 25% by weight of monomeric diisocyanate for the blocking. In such cases the diisocyanate is trimerized to the required extent and then reacted, without previous monomer removal, with the blocking agent in the manner described.

The procedure for the blocking of the cyanate adducts B) containing urethane groups is analogous. The monomer-free adducts B) are prepared by reacting the diisocyanate—that is to say, for example, isophorone diisocyanate, cyclohexane 1,4-diisocyanate, di(4-isocyanatocyclohexyl)methane—with the polyol such as, for example, trimethylolpropane, glycerol, pentaerythritol, tris(hydroxyethyl) isocyanurate in the diisocyanate:polyol molar ratio of 10–20:1 and subsequently removing the unreacted diisocyanate by thin-film distillation.

When the isocyanate adduct B) containing urethane groups is reacted with up to 25% by weight of monomeric diisocyanate for the blocking, the diisocyanate is reacted with the polyol in such a way that 2–2.5 NCO equivalents of diisocyanate are reacted per OH group of the polyol. The reaction product is then blocked in the described manner without previous monomer removal.

The isocyanate adducts C) containing biuret groups are prepared as disclosed in DE-A 2,308,015. The diisocyanate is in this case reacted with $H_2O$ in the molar ratio of 10–20:1; the unreacted diisocyanate is then in turn removed by thin-film distillation. When the isocyanate adduct C) containing biuret groups mixed with monomeric diisocyanate is employed for the blocking, the diisocyanate is reacted with $H_2O$ in the molar ratio of 3–4:1 and after the reaction has taken place and without previous monomer removal by thin-film distillation is reacted with the blocking agent in the manner described.

Preferably employed as blocking agent in the process according to the invention is ε-caprolactam, but acetone oxime or methyl ethyl ketone oxime or 2-phenylimidazoline can also be employed for the blocking.

The compounds according to the invention are suitable for producing 1-component PUR coatings, especially PUR powder coatings.

Compounds suitable as reactants for PUR powder coatings are those having functional groups which react with isocyanate groups during the hardening process as a function of the temperature and time, for example hydroxyl, carboxyl, mercapto, amino, urethane and (thio)urea groups. Polymers which can be employed are condensation polymers and addition polymers.

Preferred components are primarily polyethers, polythioethers, polyacetals, polyesteramides, epoxy resins with hydroxyl groups in the molecule, aminoplastics and their modification products with polyfunctional alcohols, polyazomethines, polyurethanes, polysulphonamides, melamine derivatives, cellulose esters and ethers, partially hydrolyzed homo- and copolymers of vinyl esters, but especially polyesters and acrylic resins.

The polyesters containing hydroxyl groups which are employed according to the invention have an OH functionality of 2.5 to 5, preferably of 3 to 4.2, an average molecular weight ($\overline{M}w$) of 1800 to 5000, preferably of 2300 to 4500, an OH number of 25 to 120 mg KOH/g, preferably of 30 to 90 mg KOH/g, an intrinsic viscosity of $<80,000$ mPa.s, preferably of $<60,000$ mpa.s, particularly preferably of $<40,000$ mpa.s at 160° C. and a melting point of $\geq 70°$ C. to $\leq 120°$ C., preferably of $\geq 75°$ C. to $\leq 100°$ C.

Carboxylic acids preferred for the preparation of polyesters can be aliphatic, cycloaliphatic, aromatic and/or heterocyclic and may be optionally substituted by halogen atoms and/or unsaturated. Examples of these which may be mentioned are:

succinic, adipic, suberic, azelaic, sebacic, phthalic, terephthalic, isophthalic, trimellitic, pyromellitic, tetrahydrophthalic, hexahydrophthalic, hexahydroterephthalic, di- and tetrachlorophthalic, endomethylenetetrahydrophthalic, glutaric, maleic and fumaric acid and where available—the anhydrides thereof, dimethyl terephthalate, bisglycol terephthalate, additionally cyclic monocarboxylic acids such as benzoic acid, p-tert.-butylbenzoic acid or hexahydrobenzoic acid.

Examples of suitable polyhydric alcohols are ethylene glycol, 1,2- and 1,3-propylene glycol, 1,4- and 2,3-butylene glycol, di-β-hydroxyethylbutanediol, 1 6-hexanediol, 1,8-octanediol, neopentyl glycol, cyclohexanediol, bis(1,4-hydroxymethyl)cyclohexane, 2,2-bis(4-hydroxycyclohexyl)propane, 2,2-bis{4-(β-hydroxyethoxy)phenyl}propane, 2-methyl-1,3-propanediol, 3-methyl-1,5-pentanediol, 2,2,4(2,4,4)-trimethyl-1,6-hexanediol, glycerol, trimethylolpropane, trimethylolethane, 1,2,6-hexanetriol, 1,2,4-butanetriol, tris(β-hydroxyethyl) isocyanurate, pentaerythritol, mannitol and sorbitol, as well as diethylene glycol, triethylene glycol, tetraethylene glycol, dipropylene glycol, polypropylene glycols, polybutylene glycols, xylylene glycol and neopentyl glycol hydroxypivalate.

It is also possible to employ mono- and polyesters from lactones, for example ε-caprolactone or hydroxy carboxylic acids, for example hydroxypivalic acid, ω-hydroxydecanoic acid, ω-hydroxycaproic acid, thioglycolic acid. Polyesters from the above-mentioned polycarboxylic acids or derivative thereof and polyphenols such as hydroquinone, bisphenol A, 4,4'-dihydroxybiphenyl or bis(4-hydroxyphenyl) sulphone; polyesters of carbonic acid which can be obtained from hydroquinone, diphenylolpropane, p-xylylene glycol, ethylene glycol, butanediol or 1,6-hexanediol or other polyols by conventional condensation reactions, for example with phosgene or diethyl or diphenyl carbonate, or from cyclic carbonates such as glycol carbonate or vinylidene carbonate, by polymerization in a known manner; polyesters of silicic acid, polyesters of phosphoric acid, for example from methane-, ethane-, β-chloroethane-, benzene- or styrenephosphoric acid, -phosphoric acid chloride or -phosphoric acid ester and polyalcohols or polyphenols of the abovementioned type; polyesters of boric acid; polysiloxanes such as, for example, the products obtainable by hydrolysis of dialkyldichlorosilanes with water and subsequent treatment with polyalcohols, and the products obtainable by addition of polysiloxane dihydrides onto olefines such as allyl alcohol or acrylic acid.

Examples of preferred polyesters are also the reaction products of polycarboxylic acids and glycidyl compounds as are described, for example, in DE-A 2,410,513.

Examples of glycidyl compounds which can be used are esters of 2,3-epoxy-1-propanol with monobasic acids which have 4 to 18 carbon atoms, such as glycidyl palmitate, glycidyl laurate and glycidyl stearate, alkylene oxides with 4 to 18 carbon atoms such as butylene oxide and glycidyl ethers such as octyl glycidyl ethers.

Dicarboxylic acids which can be used in this process are all the polycarboxylic acids listed under II below. It is likewise possible to employ monocarboxylic acids which are listed, for example, under III.

Monomeric esters, for example, dicarboxylic acid bis(hydroxy alcohol) esters, monocarboxylic esters of more than dihydric polyols and oligoesters which can be prepared by condensation reactions from raw materials customary in surface coating chemistry. Examples of these are regarded as being:

I. alcohols with 2 to 24, preferably 2 to 10 carbon atoms, and 2 to 6 OH groups bonded to non-aromatic carbon atoms, for example ethylene glycol, propylene glycol, diethylene glycol, dipropylene glycol, butanediols, neopentyl glycol, hexanediols, hexanetriols, perhydrobisphenol, dimethylolcyclohexane, glycerol, trimethylolethane, trimethylolpropane, pentaerythritol, dipentaerythritol, mannitol.

II. di- and polycarboxylic acids with 4 to 36 carbon atoms and 2 to 4 carboxyl groups, and the derivatives thereof amenable to esterification, such as anhydrides and esters, for example phthalic acid (anhydride), isophthalic acid, terephthalic acid, alkyltetrahydrophthalic acid, endomethylenetetrahydrophthalic anhydride, adipic acid, succinic acid, maleic acid, fumaric acid, dimer fatty acid, trimellitic acid, pyromellitic acid, azelaic acid;

III. monocarboxylic acids with 6 to 24 carbon atoms, for example octanoic acid acid (i.e. caprylic acid), 2-ethylhexanoic acid, benzoic acid, p-tert.-butylbenzoic acid, hexahydrobenzoic acid, monocarboxylic acid mixtures of natural oils and fats such as coconut oil fatty acid, soya oil fatty acid, ricinene fatty acid, hydrogenated and isomerized fatty acids such as "Konjuvandol" fatty acid, and mixtures thereof, it also being possible for the fatty acids to be employed as glycerides and to be reacted with transesterification and/or dehydration;

IV. monohydric alcohols with 1 to 18 carbon atoms, for example methanol, ethanol, isopropanol, cyclohexanol, benzyl alcohol, isodecanol, nonanol, octanol, oleyl alcohol.

The polyesters can be obtained in a manner known per se by condensation in an inert gas atmosphere at temperatures from 100° to 260° C., preferably 130° to 220° C., in the melt or in an azeotropic procedure, as is described, for example, in Methoden der Organischen Chemie (Methods of Organic Chemistry) (Houben-Weyl), Volume 14/2, 1-5, 21-23, 40-44, Georg Thieme Verlag, Stuttgart, 1963 or by C. R. Martens, Alkyd Resins, 51-59, Reinhold Plastics Appl. Series, Reinhold Publishing Comp., New York, 1961.

Acrylic resins which can preferably be used as OH components are homo- or copolymers, it being possible to select, for example, the following monomers as starting materials:

esters of acrylic acid and methacrylic acid with dihydric saturated aliphatic alcohols with 2 to 4 carbon atoms such as, for example, 2-hydroxyethyl acrylate, 2-hydroxypropyl acrylate, 4-hydroxybutyl acrylate and the corresponding methacrylates; alkyl acrylates and methacrylates with 1 to 18, preferably 1 to 8 carbon atoms in the alcohol component, such as, for example, methyl acrylate, ethyl acrylate, propyl acrylate, isopropyl acrylate, n-butyl acrylate, tert.-butyl acrylate, 2-ethylhexyl acrylate, stearyl acrylate and the corresponding methacrylates; cyclohexyl acrylate and methacrylate; acrylonitrile and methacrylonitrile; acrylamide and methacrylamide; N-methoxymethyl(meth)acrylamide.

Particularly preferred acrylic resins are copolymers of a. 0 to 50% by weight of monoesters of acrylic or methacrylic acid with dihydric or polyhydric alcohols, such as 1,4-butanediol monoacrylate, hydroxypropyl (meth)acrylate; furthermore vinylglycol, vinylthioethanol, allyl alcohol, 1,4-butanediol monovinyl ether;

b. 5 to 95% by weight of esters of acrylic acid or methacrylic acid with monohydric alcohols which contain 1 to 12 carbon atoms, such as, for example, methyl methacrylate, ethyl acrylate, n-butyl acrylate or 2-ethylhexyl acrylate;

c. 0 to 50% by weight of aromatic vinyl compounds such as styrene, methylstyrene or vinyltoluene;

d. 0 to 20% by weight of other monomers with functional groups, such as, for example, acrylic acid, methacrylic acid, crotonic acid, itaconic acid, maleic acid, fumaric acid, maleic anhydride, maleic monoesters, acrylamide, methacrylamide, acrylonitrile or N- methylol(meth)acrylamide, and glycidyl (meth) acrylate, the content of group a. and/or d. being at least 5% by weight.

The acrylic resins can be prepared by conventional methods, such as solution, suspension, emulsion or precipitation polymerization; but preferably by bulk polymerization which, in turn, can be initiated with UV light.

Other polymerization initiators may also be used such as the conventional peroxides or azo compounds, for example, dibenzoyl peroxide, tert.-butyl perbenzoate or azodiisobutyronitrile. The molecular weight can be controlled, for example, with sulphur compounds such as tert.-dodecyl mercaptan.

Preferred polyethers can be prepared, for example, by addition polymerization of epoxides such as ethylene oxide, propylene oxide, butylene oxide, trimethylene oxide, 3,3-bis(chloromethyl)oxacyclobutane, tetrahydrofuran, styrene oxide, the bis(epoxypropyl) ether of diphenylolpropane or epichlorohydrin, with themselves, for example in the presence of $BF_3$, or by addition of these epoxides, where appropriate in a mixture or successively, onto starting components with reactive hydrogen atoms, such as alcohols or amines, for example water, ethylene glycol, 1,3- or 1,2-propylene glycol, pentamethylene glycol, hexanediol, decamethylene glycol, trimethylolpropane, 4,4'-dihydroxydiphenylpropane, aniline, ammonia, ethanolamine, ethylenediamine, di($\beta$-hydroxyethyl)aniline, hydrazine, as well as hydroxyalkylated phenols such as, for example, di($\beta$-hydroxyethyl)resorcinol.

It is likewise possible to use polyurethanes and/or polyureas containing hydroxyl groups.

It is, of course, possible to use mixtures of several substances as polyhydroxy compounds.

The mixing ratio of polymers containing hydroxyl groups and isocyanate components is usually chosen so that there are from 0.6 to 1.2, preferably 0.8 to 1.1, very particularly preferably 1.0, NCO groups per OH group.

For the production of PUR powder coatings, the isocyanate component is mixed with the suitable polymer containing hydroxyl groups and, where appropriate, catalysts, pigments, fillers and levelling agents, for example silicone oil, liquid acrylic resins, and homogenized in the melt. This can take place in suitable units such as, for example, heatable kneaders, but preferably by extrusion, in which case upper limits of temperature of 130° to 140° C. must not be exceeded. The extruded composition is cooled to room temperature and suitably comminuted and then ground to give the powder ready for spraying. The application of the powder ready for spraying onto suitable substrates can be carried out by known processes such as, for example, by electrostatic powder spraying, fluidized bed coating, electrostatic fluidized bed coating. After application of the powder, the coated workpieces are heated at a temperature of 160° to 220° C. for 60 to 10 minutes, preferably at 180° to 210° C. for 30 to 10 minutes, for curing.

A. Preparation of the Compounds According to the Invention

1. General Preparation Procedure

The blocking agent is added in portions to the melted diisocyanate adduct (130°-160° C.). The viscosity of the reaction mixture increases in proportion with the extent of reaction of the diisocyanate adduct with the blocking agent and reaches the maximum when exactly 1 mol of blocking agent has reacted per NCO equivalent of the diisocyanate adduct. In some cases, the reaction mixture must then be heated to about 180° C. for thorough mixing. However, this is necessary only for a short time because the melting point of the reaction mixture decreases very rapidly on further addition of the blocking agent. After addition of the blocking agent is complete, heating at 140° C. is continued for approximately a further 1 h to complete the reaction.

EXAMPLE 1

242 parts by weight of trimeric isophorone diisocyanate (IPDI-T 1890; commercial product of Hüls AG) are reacted with 169.5 parts by weight of $\epsilon$-caprolactam in accordance with the general preparation procedure. The reaction product had a melting range of 85°-95° C. and a blocked NCO content of 9.5%; free NCO groups were no longer detectable.

EXAMPLE 2

242 parts by weight of trimeric isophorone diisocyanate were reacted with 141.25 parts by weight of $\epsilon$-caprolactam in analogy to Example 1. The reaction product had a melting range of 116°-120° C. and a blocked NCO content of 10.4%; free NCO groups were no longer detectable.

EXAMPLE 3

IPDI was trimerized to an NCO content of 20.9% as disclosed in DE-C 2,712,931. 201 parts by weight of this trimerized IPDI were reacted with 141.25 parts by weight of $\epsilon$-caprolactam in analogy to Example 1. The reaction product had a melting range of 92°-100° C. and a blocked NCO content of 12%.

EXAMPLE 4

IPDI was trimerized to an NCO content of 22.9% as disclosed in DE-C 2,712,931. 183.4 parts by weight of this trimerized IPDI were reacted with 141.25 parts by weight of $\epsilon$-caprolactam in analogy to Example 1. The reaction product had a melting range of 79°-84° C. and a blocked NCO content of 12.6%; free NCO groups were no longer detectable.

EXAMPLE 5

134 parts by weight of trimethylolpropane were added in portions to 666 parts by weight of IPDI at 80° C., and heating at 80° C. was continued until the NCO content had fallen to 15.7%. Then 508.5 parts by weight of $\epsilon$-caprolactam were reacted in accordance with the general preparation procedure. The reaction product had a melting range of 83°-90° C. and a blocked NCO content of 9.6%; free NCO groups were not detectable.

EXAMPLE 6

242 parts by weight of trimeric IPDI were reacted with 108.75 parts by weight of methyl ethyl ketone oxime in accordance with Example 1. The reaction product had a melting range of 101°-116° C.; the blocked NCO content was 12.5%. Free NCO groups were no longer detectable.

EXAMPLE 7

242 parts by weight of trimeric IPDI were reacted with 182.5 parts by weight of 2-phenylimidazoline in accordance with the general preparation procedure. The reaction product had a melting range of 119°-127° C. and a blocked NCO content of 9.6%; free NCO was no longer detectable.

B. Polyol Component

EXAMPLE 8

The polyol component employed in the Use Examples was a polyester containing hydroxyl groups supplied by Hoechst. According to the manufacturer, the polyester has the following characteristics:

| OH number: | 55–60 mg KOH/g |
|---|---|
| Acid number: | 3–5 mg KOH/g |
| Melting range: | 70–75° C. |
| Glass transition temperature: | 50° C. |
| Viscosity at 160° C.: | 28,000 mPa.s |

EXAMPLE 9

The starting components 10 mol of terephthalic acid, 10 mol of dimethyl terephthalate, 6.25 mol of 1,6-hexanediol, 10.5 mol of neopentyl glycol, 2 mol of 1,4-dimethylolcyclohexane and 2.9 mol of trimethylolpropane are placed in a reactor and heated with an oil bath. After most of the substances have melted, 0.05% by weight of di-n-butyltin oxide is added as catalyst at a temperature of 160° C. The first methanol elimination takes place at a temperature of about 170° C. The temperature is increased to 220° to 230° C. over the course of 6 to 8 hours and the reaction is completed over the course of a further 12 to 15 hours. The polyester is cooled to 200° C. and volatiles are substantially removed by applying vacuum (1.33 mbar) over the course of 30 to 45 minutes. Throughout the reaction time the bottom product is stirred and a gentle stream of $N_2$ is passed through the reaction mixture.

The polyester containing hydroxyl group has the following characteristic data:

| OH number: | 55–60 mg KOH/g |
|---|---|
| Acid number: | 3–4 mg KOH/g |
| Melting range: | 73–78° C. |
| Glass transition temperature: | ≈50° C. |
| Viscosity at 160° C.: | 25,000 mPa.s |

C. Polyurethane Powder Coatings
General Production Procedure

The ground products, crosslinker, polyester, levelling agent, where appropriate catalyst masterbatch, are intimately mixed, where appropriate with the white pigment and, where appropriate, fillers and benzoin in an edge mill and subsequently homogenized in an extruder at 90° to 130° C. After cooling, the extrudate is broken up and ground with a pinned disc mill to a particle size of <100 μm. The powder produced in this way is applied with an electrostatic powder spraying system at 60 kV to degreased, where appropriate pretreated iron sheets and stoved in a circulating air oven at temperatures between 180° and 200° C.

Levelling Agent Masterbatch

10% by weight of the levelling agent—a commercially available copolymer of butyl acrylate and 2-ethylhexyl acrylate—are homogenized in the appropriate polyester in the melt and, after solidification, comminuted.

Catalyst Masterbatch

5% by weight of the catalyst, in this case di-n-butyltin dilaurate, are homogenized in the appropriate polyester in the melt and, after solidification, comminuted.

The abbreviations in the following Tables mean:
CT=coating thickness in μm
HK=pendulum damping by the König method in sec (DIN 53 157)
BH=Buchholz hardness (DIN 53 153)
EI=Erichsen indentation in nm (DIN 53 156)
CA=Crosshatch adhesion test (DIN 53 151)
GG 60°=Measurement of the Gardner gloss (ASTM-D 523)
Imp. rev.=Impact reverse in g·m

EXAMPLE 10

The powder coating with the following formula was produced by the described process and was applied and stored at between 180° C. and 200° C.

353.7 parts by weight of polyester according to Example B 8
191.3 parts by weight of crosslinker according to Example A 1
400.0 parts by weight of white pigment (TiO$_2$)
50.0 parts by weight of levelling agent masterbatch
5.0 parts by weight of benzoin

| Stoving conditions Time/temp. min °C. | Characteristic mechanical data | | | | | | |
|---|---|---|---|---|---|---|---|
| | CT μm | HK sec | BH | EI nm | CA | Imp. rev · g · m | GG 60° K. |
| 15/200 | 50–50 | 191 | 125 | 9.0–9.6 | 0 | >944.6 | 85 |
| 20/200 | 50–60 | 185 | 125 | 9.4–>10 | 0 | >944.6 | 85 |
| 25/200 | 50–55 | 816 | 125 | >10 | 0 | >944.6 | 85 |
| 25/180 | 55–50 | 193 | 125 | >10 | 0 | 806.4 | 86 |
| 30/180 | 50 | 195 | 125 | >10 | 0 | >944.6 | 86 |

EXAMPLE 11

The powder coating with the following formula was produced by the described process and was applied and stoved at between 180° C. and 200° C.

365.2 parts by weight of polyester according to Example B8
179.8 parts by weight of crosslinker according to Example A2
400.0 parts by weight of white pigment (TiO$_2$)
50.0 parts by weight of levelling agent master-batch
5.0 parts by weight of benzoin

| Stoving conditions Time/temp. min °C. | Characteristic mechanical data | | | | | | |
|---|---|---|---|---|---|---|---|
| | CT μm | HK sec | BH | EI nm | CA | Imp. rev · g · m | GG 60° K. |
| 15/200 | 50–50 | 184 | 125 | >10 | 0 | >944.6 | 84 |
| 20/200 | 50 | 186 | 125 | >10 | 0 | >944.6 | 84 |
| 25/200 | 50–55 | 190 | 125 | >10 | 0 | >944.6 | 84 |
| 25/180 | 55–60 | 196 | 125 | 9.2–→10 | 0 | 576.0 | 86 |

| Stoving conditions Time/temp. min °C | Characteristic mechanical data | | | | | | |
|---|---|---|---|---|---|---|---|
| | CT μm | HK sec | BH | EI nm | CA | Imp. rev · g · m | GG 60° K. |
| 30/180 | 50-60 | 200 | 125 | 9.2→10 | 0 | 691.2 | 86 |

EXAMPLE 12

The powder coating with the following formula was produced by the described process and was applied and stoved at between 180° C. and 200° C.

- 391.8 parts by weight of polyester according to Example B8
- 153.2 parts by weight of crosslinker according to Example A2
- 400.0 parts by weight of white pigment (TiO$_2$)
- 50.0 parts by weight of levelling agent master-batch
- 5.0 parts by weight of benzoin

| Stoving conditions Time/temp. min °C | Characteristic mechanical data | | | | | | |
|---|---|---|---|---|---|---|---|
| | CT μm | HK sec | BH | EI nm | CA | Imp. rev · g · m | GG 60° K. |
| 15/200 | 65-80 | 194 | 125 | 9.9→10 | 0 | 806.4 | 85 |
| 20/200 | 70-80 | 193 | 111 | >10 | 0 | 806.4 | 85 |
| 25/200 | 60-70 | 188 | 111 | >10 | 0 | >944.6 | 85 |
| 25/180 | 70-80 | 196 | 111 | 6.9→8.5 | 0 | 115.2 | 85 |
| 30/180 | 60-70 | 184 | 111 | >10 | 0 | 691.2 | 85 |

EXAMPLE 13

The powder coating with the following formula was produced by the described process and was applied and stoved at between 180° C. and 200° C.

- 353.0 parts by weight of polyester according to Example B8
- 192.0 parts by weight of crosslinker according to Example A2
- 400.0 parts by weight of white pigment (TiO$_2$)
- 50.0 parts by weight of levelling agent master-batch
- 5.0 parts by weight of benzoin

| Stoving conditions Time/temp. min °C | Characteristic mechanical data | | | | | | |
|---|---|---|---|---|---|---|---|
| | CT μm | HK sec | BH | EI nm | CA | Imp. rev · g · m | GG 60° K. |
| 15/200 | 60-60 | 190 | 111 | 9.5→10 | 0 | >944.6 | 87 |
| 20/200 | 50-60 | 186 | 111 | >10 | 0 | >944.6 | 86 |
| 25/200 | 50-60 | 187 | 125 | >10 | 0 | >944.6 | 85 |
| 25/180 | 50-60 | 194 | 111 | >10 | 0 | 806.4 | 86 |
| 30/180 | 55-70 | 192 | 111 | >10 | 0 | >944.6 | 86 |

EXAMPLE 14

The powder coating with the following formula was produced by the described process and was applied and stoved at between 180° C. and 200° C.

- 382.6 parts by weight of polyester according to Example B9
- 162.4 parts by weight of crosslinker according to Example A3
- 400.0 parts by weight of white pigment (TiO$_2$)
- 50.0 parts by weight of levelling agent master-batch
- 5.0 parts by weight of benzoin

| Stoving conditions Time/temp. min °C | Characteristic mechanical data | | | | | | |
|---|---|---|---|---|---|---|---|
| | CT μm | HK sec | BH | EI nm | CA | Imp. rev · g · m | GG 60° K. |
| 15/200 | 50-55 | 192 | 125 | 9.3→10 | 0 | 806.4 | 84 |
| 20/200 | 60-70 | 193 | 125 | >10 | 0 | >944.6 | 85 |
| 25/200 | 60-75 | 194 | 125 | >10 | 0 | >944.6 | 85 |
| 25/180 | 50 | 190 | 125 | >10 | 0 | 691.2 | 85 |
| 30/180 | 60-70 | 202 | 125 | >10 | 0 | >944.6 | 86 |

EXAMPLE 15

The powder coating with the following formula was produced by the described process and was applied and stoved at between 180° C. and 200° C.

- 353.0 parts by weight of polyester according to Example B8
- 162.0 parts by weight of crosslinker according to Example A3
- 400.0 parts by weight of white pigment (TiO$_2$)
- 50.0 parts by weight of levelling agent master-batch
- 5.0 parts by weight of benzoin

| Stoving conditions Time/temp. min °C | Characteristic mechanical data | | | | | | |
|---|---|---|---|---|---|---|---|
| | CT μm | HK sec | BH | EI nm | CA | Imp. rev · g · m | GG 60° K. |
| 15/200 | 50-60 | 188 | 125 | >10 | 0 | >944.6 | 84 |
| 20/200 | 50-60 | 187 | 125 | >10 | 0 | >944.6 | 84 |
| 25/200 | 60-75 | 192 | 125 | >10 | 0 | >944.6 | 84 |
| 25/180 | 60-70 | 194 | 125 | >10 | 0 | >944.6 | 85 |
| 30/180 | 60 | 199 | 125 | >10 | 0 | >944.6 | 85 |

EXAMPLE 16

The powder coating with the following formula was produced by the described process and was applied and stoved at between 180° C. and 200° C.

388.2 parts by weight of polyester according to Example B8
156.8 parts by weight of crosslinker according to Example A4
400.0 parts by weight of white pigment (TiO$_2$)
50.0 parts by weight of levelling agent master-batch
5.0 parts by weight of benzoin

| Stoving conditions Time/temp. min °C. | Characteristic mechanical data | | | | | | |
|---|---|---|---|---|---|---|---|
| | CT μm | HK sec | BH | El nm | CA | Imp. rev · g · m | GG 60° K. |
| 15/200 | 75–80 | 196 | 125 | >10 | 0 | >944.6 | 84 |
| 20/200 | 60–70 | 189 | 125 | >10 | 0 | >944.6 | 85 |
| 25/200 | 70–80 | 194 | 125 | >10 | 0 | >944.6 | 85 |
| 25/180 | 70–80 | 195 | 125 | >10 | 0 | >944.6 | 85 |
| 30/180 | 60–70 | 196 | 125 | >10 | 0 | >944.6 | 85 |

EXAMPLE 17

The powder coating with the following formula was produced by the described process and was applied and stoved at between 180° C. and 200° C.

377.0 parts by weight of polyester according to Example B9
168.0 parts by weight of crosslinker according to Example A4
400.0 parts by weight of white pigment (TiO$_2$)
50.0 parts by weight of levelling agent master-batch
5.0 parts by weight of benzoin

| Stoving conditions Time/temp. min °C. | Characteristic mechanical data | | | | | | |
|---|---|---|---|---|---|---|---|
| | CT μm | HK sec | BH | El nm | CA | Imp. rev · g · m | GG 60° K. |
| 15/200 | 65–70 | 190 | 111 | >10 | 0 | >944.6 | 86 |
| 20/200 | 60–75 | 187 | 125 | >10 | 0 | >944.6 | 86 |
| 25/200 | 55–70 | 189 | 125 | >10 | 0 | >944.6 | 87 |
| 25/180 | 60–65 | 191 | 125 | >10 | 0 | >944.6 | 86 |
| 30/180 | 55–65 | 193 | 125 | >10 | 0 | >944.6 | 86 |

EXAMPLE 18

The powder coating with the following formula was produced by the described process and was applied and stoved at between 180° C. and 200° C.

412.5 parts by weight of polyester according to Example B8
132.5 parts by weight of crosslinker according to Example A4
400.0 parts by weight of white pigment (TiO$_2$)
50.0 parts by weight of levelling agent master-batch
5.0 parts by weight of benzoin

| Stoving conditions Time/temp. min °C. | Characteristic mechanical data | | | | | | |
|---|---|---|---|---|---|---|---|
| | CT μm | HK sec | BH | El nm | CA | Imp. rev · g · m | GG 60° K. |
| 15/200 | 50–60 | 187 | 125 | >10 | 0 | >944.6 | 86 |
| 20/200 | 60–70 | 185 | 125 | >10 | 0 | >944.6 | 86 |
| 25/200 | 50–60 | 186 | 125 | >10 | 0 | >944.6 | 86 |
| 25/180 | 70 | 193 | 125 | >10 | 0 | 806.4 | 87 |
| 30/180 | 50–60 | 190 | 125 | >10 | 0 | >944.6 | 86 |

EXAMPLE 19

The powder coating with the following formula was produced by the described process and was applied and stoved at between 180° C. and 200° C.

355.0 parts by weight of polyester according to Example B8
190.0 parts by weight of crosslinker according to Example A5
400.0 parts by weight of white pigment (TiO$_2$)
50.0 parts by weight of levelling agent master-batch
5.0 parts by weight of benzoin

| Stoving conditions Time/temp. min °C. | Characteristic mechanical data | | | | | | |
|---|---|---|---|---|---|---|---|
| | CT μm | HK sec | BH | El nm | CA | Imp. rev · g · m | GG 60° K. |
| 15/200 | 50–60 | 188 | 125 | >10 | 0 | >944.6 | 85 |
| 20/200 | 60–65 | 183 | 125 | >10 | 0 | >944.6 | 85 |
| 25/200 | 70 | 188 | 125 | >10 | 0 | >944.6 | 85 |
| 25/180 | 50 | 187 | 125 | >10 | 0 | >944.6 | 88 |
| 30/180 | 50–60 | 190 | 125 | >10 | 0 | >944.6 | 88 |

EXAMPLE 20

The powder coating with the following formula was produced by the described process and was applied and stoved at between 180° C. and 200° C.

382.5 parts by weight of polyester according to Example B8
162.5 parts by weight of crosslinker according to Example A5
400.0 parts by weight of white pigment (TiO$_2$)
50.0 parts by weight of levelling agent master-batch
5.0 parts by weight of benzoin

| Stoving conditions | Characteristic mechanical data | | | | | | |
|---|---|---|---|---|---|---|---|
| Time/temp. min °C. | CT μm | HK sec | BH | El nm | CA | Imp. rev · g · m | GG 60° K. |
| 15/200 | 50-60 | 189 | 125 | >10 | 0 | >944.6 | 86 |
| 20/200 | 60-70 | 193 | 125 | >10 | 0 | >944.6 | 86 |
| 25/200 | 50-60 | 189 | 125 | >10 | 0 | >944.6 | 86 |
| 25/180 | 50-60 | 192 | 125 | >10 | 0 | >944.6 | 86 |
| 30/180 | 60-70 | 194 | 125 | >10 | 0 | >944.6 | 87 |

EXAMPLE 21

The powder coating with the following formula was produced by the described process and was applied and stoved at between 180° C. and 200° C.

- 342.5 parts by weight of polyester according to Example B9
- 202.5 parts by weight of crosslinker according to Example A5
- 400.0 parts by weight of white pigment (TiO2)
- 50.0 parts by weight of levelling agent master-batch
- 5.0 parts by weight of benzoin

| Stoving conditions | Characteristic mechanical data | | | | | | |
|---|---|---|---|---|---|---|---|
| Time/temp. min °C. | CT μm | HK sec | BH | El nm | CA | Imp. rev · g · m | GG 60° K. |
| 15/200 | 60-70 | 193 | 125 | >10 | 0 | 806.4 | 86 |
| 20/200 | 65-75 | 187 | 125 | >10 | 0 | >944.6 | 86 |
| 25/200 | 60-70 | 191 | 125 | >10 | 0 | >944.6 | 86 |
| 25/180 | 50-60 | 190 | 125 | >10 | 0 | 806.4 | 85 |
| 30/180 | 60-70 | 195 | 125 | >10 | 0 | >944.6 | 87 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A blocked highly functionalized polyisocyanate composition comprising:
   (a) a polyisocyanate with an isocyanate functionality greater than 2; and
   (b) a blocking agent; wherein 1.25-2 mole of said blocking agent are reacted per NCO group, and wherein the melting point of said composition is less than 128° C.

2. The blocked highly functionalized polyisocyanate composition of claim 1, wherein said melting point is <120° C.

3. The blocked highly functionalized polyisocyanate composition of claim 1, wherein said melting point is from 80°-110° C.

4. The blocked highly functionalized polyisocyanate composition of claim 1, wherein said polyisocyanate is selected from the formulas below

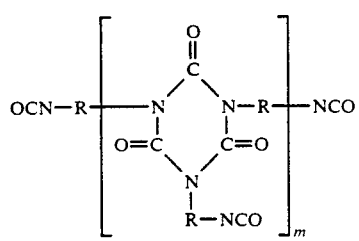
(A)

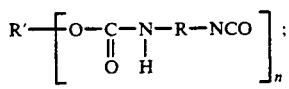
(B)

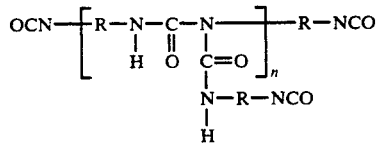
(C)

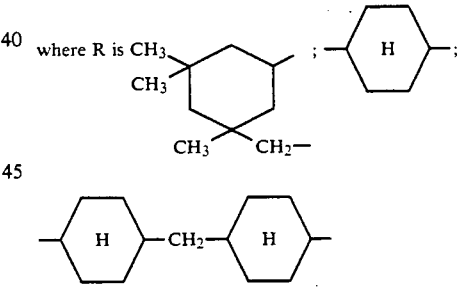

where R is CH3, and m is 1-4; n is 3 or 4 and R' is the hydrocarbon radical of a polyhydric alcohol.

5. The blocked highly functionalized polyisocyanate composition of claim 4, wherein said polyisocyanate further comprises from 0-25% by weight of monomeric diisocyanate.

6. The blocked highly functionalized polyisocyanate composition of claim 1, wherein said blocking agent is selected from the group consisting of ε-caprolactam, acetone oxime, methylethylketone oxime, 2-phenylimidazoline, and a mixture thereof.

7. The blocked highly functionalized polyisoxcyanate composition of claim 1, wherein said blocking agent is ε-caprolactam.

8. A process for the preparation of a blocked polyisocyanate comprising:
   i) reacting polyisocyanates A), B) and C) of the formulas below (A) 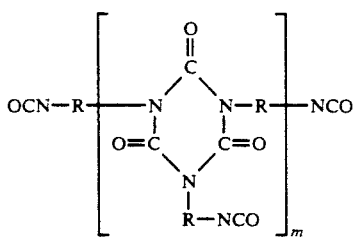

(B) 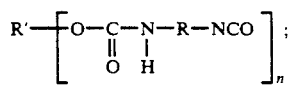

(C) 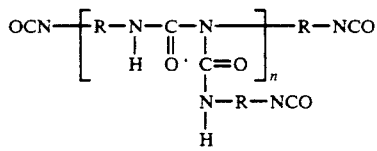

where R is 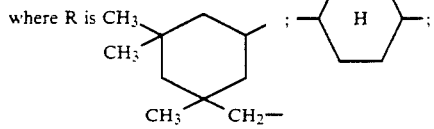

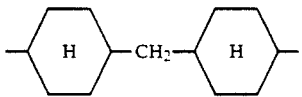

and m is 1–4; n is 3 or 4 and R' is the hydrocarbon radical of a polyhydric alcohol; with a monofunctional blocking agent, wherein 1.25–2 mol of said blocking agent are reacted per NCO equivalent.

9. The process of claim 8, wherein said polyisocyanates are melted before reacting with said blocking agent.

10. The process of claim 9, wherein said polyisocyanates are melted at a temperature of from 130°–160° C.

11. The process of claim 10, wherein said polyisocyanates and said blocking agent are further reacted at a temperature of 180° C.

12. A polyurethane resin powder coating comprising:
 a) a polymer having functional groups which react with isocyanate groups as a function of temperature and time; and
 b) a blocked highly functionalized polyisocyanate adduct according to claim 1.

13. The polyurethane resin powder coating of claim 12, wherein said polymer is selected from the group consisting of hydroxy group containing polyethers, hydroxy group containing polythioethers, hydroxy group containing polyacetals, hydroxy group containing polyesteramides, hydroxy group containing epoxy resins, aminoplastics, polyfunctional alchohol modified aminoplastics, polyazomethines, polyurethanes, polysulphonamides, melamine derivatives, cellulose esters, cellulose ethers, partially hydrolyzed homopolymers of vinyl esters, partially hydrolyzed copolymers of vinyl esters, polyesters, acrylic resins and a mixture thereof.

14. The polyurethane resin powder coating of claim 12, wherein said polymer is selected from the group consisting of polyesters and acrylic resins and a mixture thereof.

15. The polyurethane resin powder coating of claim 12, wherin said polymer is a polyester containing hydroxyl groups.

16. The polyurethane resin powder coating of claim 15, wherein said polyester has an OH functionality of from 2.5–5.

17. The polyurethane resin powder coating of claim 15, wherein said polyester has an average molecular weight ($\overline{M}w$) of from 1800–5000.

18. The polyurethane resin powder coating of claim 15, further comprising a member selected from the group consisting of catalysts, pigments, fillers, levelling agents and a mixture thereof.

* * * * *